Figure 2:
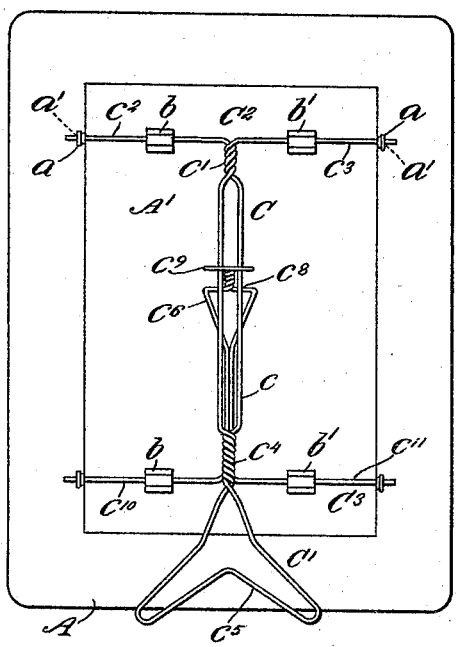

(No Model.) 2 Sheets—Sheet 1.

S. McMICHAEL.
HOLDER FOR PICTURE FRAMES.

No. 537,578. Patented Apr. 16, 1895.

Witnesses:
Thomas M. Smith.
Richard C. Maxwell.

Inventor.
Samuel McMichael,
By J. Walter Douglass.
Attorney.

(No Model.) 2 Sheets—Sheet 2.
S. McMICHAEL.
HOLDER FOR PICTURE FRAMES.
No. 537,578. Patented Apr. 16, 1895.
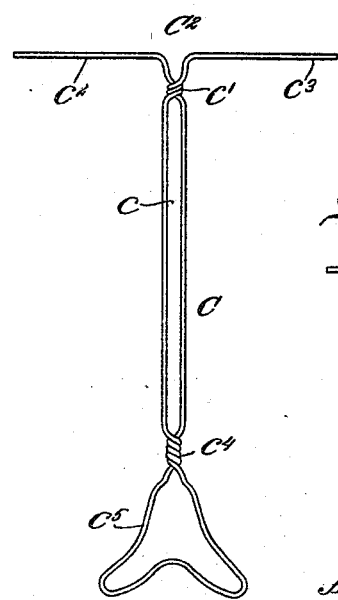
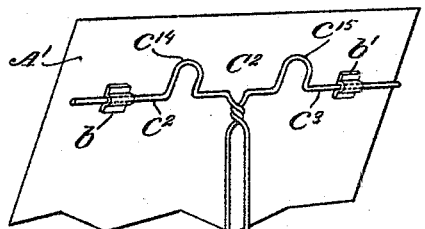
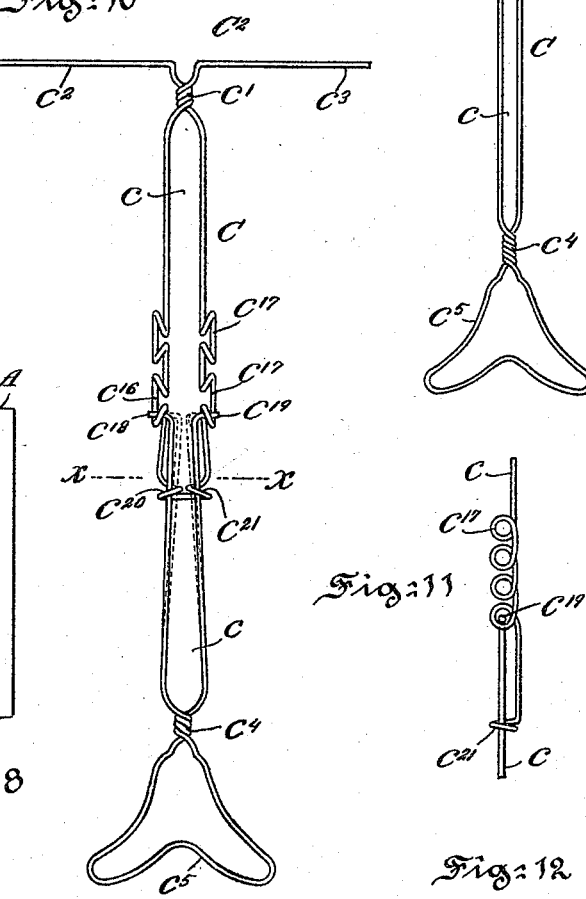
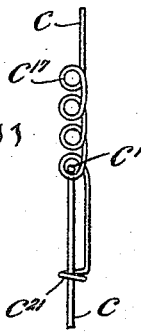

UNITED STATES PATENT OFFICE.

SAMUEL McMICHAEL, OF PHILADELPHIA, PENNSYLVANIA, ASSIGNOR OF ONE-HALF TO COLLINS C. DIBOLL, OF NEW ORLEANS, LOUISIANA.

HOLDER FOR PICTURE-FRAMES.

SPECIFICATION forming part of Letters Patent No. 537,578, dated April 16, 1895.

Application filed August 4, 1894. Serial No. 519,434. (No model.)

*To all whom it may concern:*

Be it known that I, SAMUEL MCMICHAEL, a citizen of the United States, residing at the city of Philadelphia, in the county of Philadelphia and State of Pennsylvania, have invented certain new and useful Improvements in Holders for Picture-Frames or Analogous Articles, of which the following is a specification.

My invention has relation to devices for holding or supporting picture frames, mirror stands or analogous articles, and in such connection it relates more particularly to the general construction and arrangement of the same for such purposes.

The principal objects of my invention are, first, to provide a simple, durable and effective device in pivotal connection with the back strip or plate of a picture frame or the like for supporting the same at an angle to the general plane or position thereof; second, to provide a holder for a picture-frame, standing mirror or analogous article having a locking device connected therewith and engaging the frame or body of the article so as to permit of the ready detachment of the picture or mirror from its casing or frame; third, to provide a holder for a picture frame or mirror stand composed of two pivotal members adapted to assume a compact form when not in use and connected with a back or supporting strip or board of the frame or stand and to assume a position so as to hold the frame or stand in an inclined position and to be locked so as to prevent overturning of the same; fourth, to provide a holder for a standing picture or mirror frame consisting of two pivotal engaging and locking members adapted to assume a compact form against the back of the stand or frame when not in use, and a reliable or secure position in use to hold the frame or stand in a slanting position; fifth, to provide a holder composed of two pivotal wire members adapted to be so manipulated as to permit of the ready release of the back of a frame or stand; sixth, to provide a holder for a standing picture frame or case having pivotal engaging members locking with each other in operative position and folding onto each other in inoperative position; seventh, to provide a holder for picture or other standing frames, consisting of two pivotal members, whereof one is in sliding engagement with the other and is adapted to lock therewith and provided with bars for releasing the back from its frame or stand; eighth, to provide a holder having a cross-bar adapted to be manipulated so as to engage and hold a frame or stand in connection with its detachable back, supporting plate or strip; ninth, to provide a holder for a picture frame or mirror case composed of two engaging wire members provided with cross-bars adapted to engage and hold a frame or stand to its supporting back or strip and one of said members in normal position locking with the other member to prevent overturning of said stand or frame; tenth, to provide a holder for a frame or stand having a pivotal extensible member and a pivotal member in sliding engagement therewith and adapted to be locked thereto in operative position and in inoperative position to be folded onto said extensible member so as to assume a compact form in contact with the back or supporting strip of the frame or stand, and, eleventh, to provide a picture frame or stand with a holder having two pivotal locking members in sliding engagement with each other, and one adapted to lock with the other in a certain position of the frame or stand.

My invention stated in general terms consists of the improvements in holders for picture frames or analogous articles constructed and arranged in substantially the manner hereinafter described and claimed.

The nature, characteristic features and scope of my invention will be more fully understood from the following description taken in connection with the accompanying drawings forming part hereof, and in which—

Figure 1:
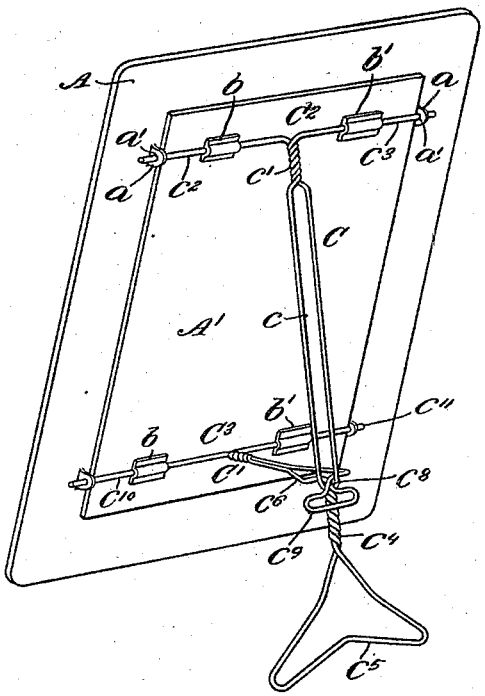
Figure 5:
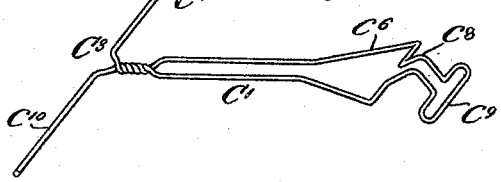
Figure 3:
Figure 6:
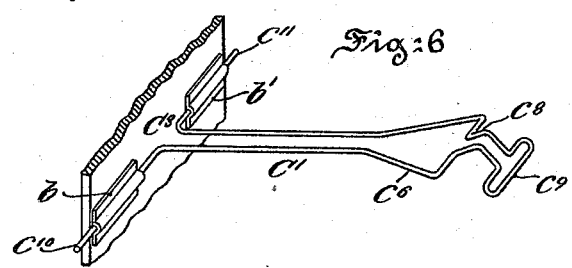
Figure 4:
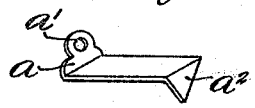

Figure 1, is a perspective view of a holder embodying features of my invention in application to the back supporting strip, board or plate of a standing picture or mirror frame, showing the holder in an operative position. Fig. 2, is a rear elevational view, showing the holder in an operative position with the members thereof folded onto each other. Fig. 3, is a perspective view of one of the staples or clips adapted to pivotally engage the cross-rods of the holder forming the locking device to secure the back to its frame or stand. Fig. 4, is a similar view of a clip of the picture frame or mirror stand with its eye for engaging one of the cross-rods of the locking device of the holder of my invention. Fig. 5, is a similar view of a modified form of the lower member of the holder with its latch and locking bars detached from the back piece or strip of a frame or stand. Fig. 6, is a similar view of a still further modified form of the device of Fig. 5, showing the locking bars arranged so as to engage and disengage the back from its frame or stand by the manipulation of the arms of the device toward and from each other. Fig. 7, is a rear elevational view of the upper member of the holder detached from the back of a frame or stand for a picture, mirror or the like and adapted for use in connection with the other member of the type fully illustrated in Figs. 5 and 6. Fig. 8, is a similar view of a modified form of one of the members of the device, adapted for employment with the member shown in Figs. 5 and 6. Fig. 9, is a similar view of a still further modified form of the member of Figs. 7 and 8, for use with the member of Figs. 5 and 6. Fig. 10, is a similar view of a still further modified form of one member of the holder, in this instance made in two parts and extensible in a vertical direction and for use with the member of Figs. 5 and 6. Fig. 11, is a side elevational view in broken section of a modified form of one of the extensible looped arms of the upper member of Fig. 10; and Fig. 12, is a transverse section on the line $x-x$, of Fig. 10.

Referring to the drawings, A, is a picture or mirror frame provided with a detachable back A'. At or about the upper and lower portions and connected with the inner edges of the frame A, are secured clips $a$, provided with eyes $a'$, in one end of each of them and with a depending lip $a^2$, as shown in Fig. 4, in the other end thereof, and each of said clips is adapted to be bent onto the frame so as to assume the position as clearly illustrated in Figs. 1 and 2, for a purpose to be presently fully explained.

$b$ and $b'$, are bearing pieces inserted through the back A', at the top and bottom thereof and secured against the rear face thereof by being bent onto the same. The construction of each of the bearing pieces is of substantially the form shown in Fig. 3, and each is adapted to assume in connection with the back A, the position illustrated in Figs. 1 and 2, of the drawings.

The holder of my invention comprises two members C and C'. The member C, consists of a single piece of wire bent into an oblong loop $c$, and twisted at the upper portion into a coil $c'$, and the ends $c^2$ and $c^3$, bent outwardly in opposite directions to form a locking device $C^2$, the two ends $c^2$ and $c^3$, engaging through the bearing pieces $b$ and $b'$, so as to form a pivotal connection with the back A', and the extremities of said locking device are adapted to engage through the eyes $a'$, of the clips $a$, of the frame A. The lower end of the oblong loop $c$, of the member C, is formed into a coil $c^4$, and terminates in a triangular-shape foot or standard $c^5$, for supporting the frame or stand in an inclined position, when the member C, is caused to assume the position illustrated in Fig. 1. The other member C', comprises an oblong loop $c^6$, bent outwardly so as to assume a triangular form and to constitute a back stop, and thence inwardly, upwardly and downwardly at $c^8$, and terminates in an inverted T-shape end forming a catch or locking device $c^9$, for engaging the member C, through the loop $c$, thereof. The opposite end of said member C', is formed into a coil and terminates in two oppositely extended arms or rods $c^{10}$ and $c^{11}$, constituting the lower locking device $C^3$, of the member C', of the holder. The locking device $C^3$, engages through bearing pieces $b$ and $b'$, located at the lower portion of the back A', of the frame or stand A, and is adapted to be extended through the eyes $a'$, of the clips $a$, as illustrated in Figs. 1 and 2.

The construction of the member C', of Fig. 1, is slightly modified in Figs. 5 and 6, by dispensing with the coil formed by the twisting of one wire with the other at one end thereof, and the two parts of the wire constituting the member C', extend in a straight line parallel to each other and are bent at the end so as to form arms $c^{10}$ and $c^{11}$, reversely arranged with respect to each other and extend through the bearing pieces $b$ and $b'$, of the back A', so as to permit of the release of the lower end of the back A', from its stand or frame A, by the manipulation of the two parts of the member C', toward each other, as clearly shown in Fig. 6.

It may be here remarked that the member C', is made of spring metal wire, so as to assume the position illustrated in Fig. 6, and to permit by a hand manipulation of the wires of said member C', toward each other of the release of the locking device thereof from the frame or stand A, through its release from the eyes $a'$, of the clips $a$, thereof.

In Fig. 5, the member C', adjacent to the arms $c^{10}$ and $c^{11}$, thereof has the two parts twisted together in the same manner as in Fig. 1, but the coil $c^8$, at the other end is dispensed with adjacent to the back-stop formed and the wires bent upward and downward to present in cross section a hump as clearly shown in Fig. 5, of the drawings.

The member C, of Fig. 7, is the same in structure as that of Fig. 1, and is applied to the back strip or piece A', of the frame A, in the manner clearly shown therein and is adapted to be employed with the member C', as shown either in Fig. 1, or in Figs. 5 and 6.

In Fig. 8, is shown a slightly modified form of the member C, of the holder, in which the upper end thereof is formed into a triangular-shaped figure $c^{13}$, adapted to engage by means of bearing pieces $b$ and $b'$, such as shown in Fig. 3, with the hinged back $A^2$, of the frame A. The lower end of said back is provided with a member $C'$, adapted by means of bearing pieces $b$ and $b'$, to encircle the locking device $C^2$, and engage the back $A^2$, with its frame A, and in such manner as to permit of the disengagement of the frame or stand A, therefrom to release a picture, mirror, or the like.

In Fig. 9, is illustrated a still further modification of my invention, in which the upper end of the member C, is provided with cross-bars $c^2$ and $c^3$, having back-stops $c^{14}$ and $c^{15}$, and said bars by means of bearing pieces $b$ and $b'$, are in pivotal connection with the back $A'$. With the oblong loop $c$, of the member C, the catch $c^9$, of the member $C'$, as shown in either Fig. 1, 2, 5 or 6, is caused to engage so as to slide therewith as well as lock with the lower portion thereof so that the holder may assume an operative position to furnish a substantial support for the stand or frame A, against displacement or overturning thereof.

In Fig. 10, a still further modification of my invention is shown. In this instance the member C, is made in two parts and has a series of loops or eyes $c^{16}$ and $c^{17}$, on both sides about midway in the length of the same and formed with the upper member and with outwardly extending catches or projections $c^{18}$ and $c^{19}$, forming engaging means for said loops or eyes formed with the lower member $C'$. The lower ends of the member C, are formed into eyes or loops $c^{20}$ and $c^{21}$, through which are inserted the wires of the lower member and arranged so as to permit by pressure exerted against said wires of the lower member $C'$, of the release of the catches or projections $c^{18}$ and $c^{19}$, of said lower member from the eyes or loops $c^{16}$ and $c^{17}$, of the upper member, whereby is afforded means for insuring in a vertical direction of the extension of said member C, with respect to the member $C'$, to adapt the holder to frames of different sizes or kinds. The lower member $C'$, of the holder of the form shown in either Fig. 5 or 6, is adapted to be employed in connection with the extensible member C, of Fig. 10, in substantially the same manner as it is employed in connection with the member C, of Figs. 1 and 2.

It will be observed by reference to the drawings that in Fig. 1, the upper and lower members of the holder by back and forth movements thereof, will cause the transverse locking bars $C^2$ and $C^3$, of the members of the holder to be disengaged from the eyes $a'$, of the clips $a$, of the frame or stand A, to permit of the release of the back $A'$. The catch $c^9$, in the form shown in Figs. 5 and 6, when in engagement with the lower end of the loop $c$, of the member C, of the holder of the type illustrated in Fig. 1, will securely hold the member $C'$, by means of the triangular-shaped back stop arranged opposite the catch $c^9$, of the member $C'$, and thus prevent overturning of the stand or frame A, in its operative position. When it is desired to close the frame face down or in an opposite position, the device as so arranged with the members thereof in sliding engagement with each other will assume the position substantially as illustrated in Fig. 2, in a compact form which is desirable for the shipment of such articles, as hereinbefore described. Moreover, a picture or mirror may be applied to a frame or stand A, having the said holder applied thereto with great facility, due to the simplicity of the arrangement of the members of the said device.

Having thus described the nature and objects of my invention, what I claim as new, and desire to secure by Letters Patent, is—

1. The combination with a picture-frame or the like and a back-strip or plate, of a holder consisting of two members in sliding engagement with each other and arranged to form T-shaped parts, the arms of which are pivoted in bearings of said back-strip or plate and the outer ends of said arms extending through eyes of said frame to hold said frame and back together, substantially as and for the purposes set forth.

2. The combination with a frame having eyes, and a back having bearings, of a holder consisting of two members, whereof the upper member is provided with a loop and with cross-arms in pivotal connection with the bearings of said back and adapted to engage the eyes of said frame, and whereof the lower member is in pivotal connection with the bearings of said back and is adapted to engage eyes of said frame, said lower member provided with a locking device engaging the upper member so as to prevent in the operative position of said two members overturning of said frame, substantially as set forth.

3. The combination with a picture-frame and a back-strip or plate, of a holder consisting of two members in detachable sliding engagement with each other, the arms of said members pivoted in bearings on said back-strip and detachably engaging eyes of said frame and one of said members provided with a catch for supporting said holder in its operative position against overturning of said frame, substantially as set forth.

4. The combination with a picture-frame and a back-strip or plate, of a holder consisting of two members provided with cross-arms in pivotal connection with said back-strip or plate, said members in sliding engagement with each other and one of said members provided with a catch for securing the other of said members against displacement, substantially as set forth.

5. The combination with a picture-frame and a back-strip, of a holder consisting of two members in sliding engagement with each other, one member provided with a foot formed into a loop and having cross-arms in pivotal connection with bearings on said back, the outer ends of said arms engaging eyes of said frame and the other member in pivotal connection with said back and provided with cross-arms engaging said back and frame and said holder adapted to be manipulated so as to release said back from said frame, substantially as and for the purposes set forth.

6. The combination with a picture-frame and a back-strip, of a holder consisting of two members in sliding engagement with each other and provided with cross-arms pivoted to said back-strip or plate and the outer ends thereof adapted to engage eyes of said frame, one of said members provided with a catch and a back-stop and the other of said members extensible, substantially as and for the purposes set forth.

7. The combination with a picture-frame and a back-strip or piece, of a holder consisting of two members having T-shaped parts, the arms of which are pivoted in bearings on said back-strip and the outer ends extending into eyes on said frame to hold said back and frame together and said members in sliding engagement with each other adapted to be manipulated so as to release said back-strip from said frame, substantially as and for the purposes set forth.

8. The combination with a picture-frame and a back-strip, of a holder consisting of two wire members having T-shaped parts and in sliding engagement with each other, the arms of said members pivoted in bearings on said back-strip and the outer ends thereof adapted to extend through eyes of said frame, one of said members provided with a catch in sliding engagement with a loop of the other member and adapted to lock the same in operative position, substantially as and for the purposes set forth.

9. The combination with a picture-frame and a back-strip, of a holder consisting of two members detachably connected with each other and provided with cross-arms pivoted to said back-strip and the outer ends thereof adapted to engage and hold said back-strip to its frame, substantially as set forth.

10. The combination with a picture-frame having eyes, of a back having a wire holder in pivotal connection therewith, a wire device provided with a catch, a back-stop and cross-arms in pivotal connection with said back and adapted to engage the eyes of said frame, substantially as and for the purposes set forth.

In testimony whereof I have hereunto set my signature in the presence of two subscribing witnesses.

SAMUEL McMICHAEL.

Witnesses:
THOMAS M. SMITH,
RICHARD C. MAXWELL.